United States Patent
Lehmann

(10) Patent No.: US 12,081,083 B2
(45) Date of Patent: Sep. 3, 2024

(54) ROTOR FOR AN ELECTRIC MOTOR, ELECTRIC MOTOR, AND METHOD FOR PRODUCING A ROTOR

(71) Applicant: Neumayer Tekfor Engineering GmbH, Hausach (DE)

(72) Inventor: Martin Lehmann, Hornberg (DE)

(73) Assignee: NEUMAYER TEKFOR ENGINEERING GMBH, Hausach (DE)

( * ) Notice: Subject to any disclaimer, the term of this patent is extended or adjusted under 35 U.S.C. 154(b) by 152 days.

(21) Appl. No.: 17/413,025

(22) PCT Filed: Oct. 9, 2019

(86) PCT No.: PCT/DE2019/000260
§ 371 (c)(1),
(2) Date: Jun. 11, 2021

(87) PCT Pub. No.: WO2020/119840
PCT Pub. Date: Jun. 18, 2020

(65) Prior Publication Data
US 2022/0021285 A1    Jan. 20, 2022

(30) Foreign Application Priority Data
Dec. 14, 2018 (DE) .................. 10 2018 009 831.2

(51) Int. Cl.
*H02K 15/03* (2006.01)
*H02K 7/00* (2006.01)
*H02K 15/00* (2006.01)

(52) U.S. Cl.
CPC ............. *H02K 15/03* (2013.01); *H02K 7/003* (2013.01); *H02K 15/0012* (2013.01); *Y10T 29/49009* (2015.01)

(58) Field of Classification Search
CPC ............ H02K 1/28; H02K 1/32; H02K 15/02; H02K 15/03; H02K 1/2706; H02K 15/028;
(Continued)

(56) References Cited

U.S. PATENT DOCUMENTS 10,224,774 B2 * 3/2019 Paul ........................ H02K 1/28
10,862,360 B2 * 12/2020 Paul ........................ H02K 9/12
(Continued)

FOREIGN PATENT DOCUMENTS

AT    008 876 U2    1/2007
DE    203 07 198 U1   10/2003
(Continued)

OTHER PUBLICATIONS

International Search Report (PCT/ISA/210) issued in PCT Application No. PCT/DE2019/000260 dated Apr. 7, 2020 with English translation (four (4) pages).
(Continued)

*Primary Examiner* — Thiem D Phan
(74) *Attorney, Agent, or Firm* — FOLEY & LARDNER LLP

(57) ABSTRACT

A rotor for an electric motor includes a shaft having a central portion supporting a laminated core of an electrical sheet material. The central portion is also composed of an electrical sheet material. The ends of the rotor shaft may be formed from a different material than the material of the central portion, and may be connected to the central portion by a force-fitting interference fit and/or a knurled interference fit. An electric motor having such a rotor and a method for producing a such a rotor are provided.

11 Claims, 3 Drawing Sheets

(58) Field of Classification Search
CPC ........ H02K 1/20; H02K 1/2793; H02K 7/088; H02K 5/1732; Y10T 29/49012; Y10T 29/49009; Y10T 29/49826
USPC ....... 29/596, 598, 602.1, 609, 729, 732, 738
See application file for complete search history.

(56) References Cited

U.S. PATENT DOCUMENTS

| | | |
|---|---|---|
| 2012/0228966 A1 | 9/2012 | Pieper et al. |
| 2019/0199152 A1 | 6/2019 | Weinmeister et al. |

FOREIGN PATENT DOCUMENTS

| | | |
|---|---|---|
| DE | 10 2010 022 621 A1 | 12/2011 |
| DE | 10 2011 001 488 A1 | 3/2012 |
| DE | 10 2011 012 429 A1 | 8/2012 |
| DE | 10 2012 110 157 A1 | 6/2014 |
| DE | 10 2016 215 090 A1 | 2/2018 |
| DE | 10 2016 215 701 A1 | 2/2018 |
| DE | 10 2016 215 979 A1 | 3/2018 |
| DE | 10 2017 011 969 A1 | 8/2018 |
| WO | WO 2017/050447 A1 | 3/2017 |
| WO | WO 2018/029263 A1 | 2/2018 |
| WO | WO 2018/036952 A1 | 3/2018 |

OTHER PUBLICATIONS

German-language Written Opinion (PCT/ISA/237) issued in PCT Application No. PCT/DE2019/000260 dated Apr. 7, 2020 (five (5) pages).

German-language Search Report issued in German Application No. 10 2018 009 831.2 dated May 31, 2019 with partial English translation (14 pages).

\* cited by examiner

ROTOR FOR AN ELECTRIC MOTOR, ELECTRIC MOTOR, AND METHOD FOR PRODUCING A ROTOR

BACKGROUND AND SUMMARY OF THE INVENTION

The present invention relates to a rotor for an electric motor, having a shaft and a laminated core of an electrical sheet material, wherein the shaft supports the laminated core and the laminated core serves as a support of permanent magnets or a squirrel cage rotor. The invention furthermore relates to an electric motor having a rotor, and to a method for producing a rotor.

Rotor shafts for electric machines (for example electric motors) nowadays are predominantly produced integrally, although there are also attempts at shafts in multiple parts, so-called constructed shafts. Integral shafts have the disadvantage that individual portions (for example the splined connection, the bearing seat or the tight fit) fulfill different functions and there are accordingly different requirements in terms of the geometry and the material properties. Therefore, a compromise has to be found for the different portions and the requirements of the latter for integral rotor shafts.

Since magnetic fields which to some extent are highly variable are generated in electric machines, the stator and the rotor are in part composed of special laminated cores (the so-called electrical sheets), for example, so as to effect high magnetic flux densities, on the one hand, and ideally low hysteresis losses and eddy current losses, on the other hand.

Multiple-part rotors are described in, for example, DE 10 2010 022 621 A1, DE 10 2011 012 429 A1, DE 10 2016 215 090 A1, DE 10 2016 215 979 A1, DE 10 2017 011 969 A1, or WO 2018/036952 A1. A rotor of an asynchronous motor having a laminated core is described in DE 10 2012 110 157 A1, for example. Special materials for the laminated cores are described in DE 10 2011 001 488 B4.

The rotor shaft supports the rotor by way of a force fit or a form fit, for example, and permits the rotor to be mechanically mounted. The rotor shaft furthermore offers a running surface, for example for a radial seal for sealing the electric machine in relation to the external surroundings, for example the gearbox. The rotor shaft in most instances by way of an external or internal toothing directs a torque into downstream or upstream units (for example the gearbox already mentioned).

A laminated core is typically situated on the rotor shaft. Depending on the design, the laminated core supports a squirrel cage or permanent magnets, for example. The laminated core here rotates at a high rotating speed and at a small spacing from the stator, and preferably also directs the magnetic flux. The laminated core is typically composed of stacked sheets which are electrically isolated in relation to one another so as to increase the electrical resistance in the axial direction. This is intended to reduce eddy currents and minimize energetic or thermal losses.

The individual sheets are composed of special iron alloys (so-called electrical sheets) which should have the following properties:

A high permeability is provided so that a large magnetic flux results.

There is a minor coercive field strength; that is to say that the material is magnetically soft. This leads to minor hysteresis losses.

Finally, there is a high electrical resistance so that eddy current losses are further minimized.

Rotor shafts are usually composed of carbon steels (C35, C45) or heat-treatable steels (42CrMo4) because the rotor shafts have to have a certain degree of hardness. The hardness is required in particular for the torque-transmitting plug-fit splines, for the tight fit and the bearing seats. Because of the limitation to specific portions, often only these portions are hardened by local heat treatment. In order for the other regions of the rotor shaft to offer positive properties for a press fit/joint and to have a certain flexural stiffness for stable rotating even at high rotating speeds, comparatively large diameters and great wall thicknesses are provided.

It has been demonstrated that the materials (for example, carbon steels or heat-treatable steels) commonly used today in the regions of the rotor in which alternating magnetic fields are generated lead to increased losses and, as a result thereof, to heat generation. Cooling systems which to some extent are complex are therefore provided for the rotors in the prior art.

The heating of the rotor has substantially three causes. Losses result on account of currents which are induced in the squirrel cage rotor. In addition, there are losses on account of undesirable eddy currents and on account of the hysteresis in the rotor.

AT 008 876 U2 discloses a three-part rotor of a testing facility. A central part of the rotor here is composed of a magnetically conducting material and serves as a back iron. Permanent-magnet poles are attached to the central part per se here.

The object of the invention lies in proposing a rotor, for example for an electric motor, which is distinguished by advantages in comparison to the prior art.

The object is achieved by the invention by a rotor shaft, by an electric motor having a rotor shaft, and by a method for producing a rotor shaft.

According to a first teaching, the object is achieved by a rotor, wherein the shaft, at least in a central portion which supports the laminated core, is composed of an electrical sheet material. The high electrical and thermal losses known in the prior art are minimized according to the invention in that at least the portion of the rotor that supports the laminated core, and in which the magnetic fields are thus generated, is composed of an electrical sheet material.

The invention thus reduces losses which result in the rotor shaft as the supporting element of the rotor. This is based on the concept that the rotor shaft also transmits part of the magnetic flux and thus can contribute toward the losses mentioned above.

Electrical sheet has special properties which are optimized for use in electric motors and transformers. These properties are achieved, for example, in that the carbon content is reduced (to less than 100 ppm), in that some alloying elements (for example chromium or titanium) are dispensed with, or in that other alloying elements (for example silicon or aluminum) are added at a specific proportion. It thus demonstrated in experiments, for example that carbon and chromium as proportions of the material reduce permeability;

that increasing the proportion of silicon increases the electric resistance without other magnetic properties being negatively affected; or that pure iron leads to very positive magnetic properties.

On account of a reduction in the proportion of carbon, electrical sheet has a generally reduced strength and can typically also not be heat-treated. However, it can be readily cold-formed because extensive elongations are possible. The strength may even be increased by cold forming.

The material of the central portion has in particular the following properties:

There is a greatest possible permeability in absolute terms.

An ideally reduced coercive field strength is provided.

The electrical resistance is as high as possible.

These properties are preferably caused by the choice of the constituents of the material and/or by the production process.

One design embodiment of the rotor lies in that the shaft in part, for example at least in the central portion, is designed as a hollow shaft.

One design embodiment provides that the shaft is composed of a plurality of components which are connected to one another. This is thus a constructed shaft, the components of the latter being connected to one another at least for transmitting a torque.

One design embodiment of the rotor lies in that the components are composed of different materials. This design embodiment permits ideally matching materials to be used in each case for different functions of the sub-portions of the shaft.

One design embodiment provides that the shaft has the central portion and two end components, that the central portion is designed as a hollow shaft and supports the laminated core, and that the two end components are connected to the central portion and composed of a material which differs from the electrical sheet material. Materials of a higher hardness or a higher strength are thus used for the end components, for example. In one design embodiment, the end components are composed of the same material, and in an alternative design embodiment differ from one another in terms of the material used.

One design embodiment of the rotor lies in that at least one of the two end components is in part disposed in the central portion. In this design embodiment, the central portion is at least in part designed so as to be hollow such that at least one end component can be at least in part received therein. The central portion is, for example, a precision rotor.

One design embodiment provides that at least one of the two end components is connected to the central portion by way of a force-fitting interference fit and, axially adjoining the latter, a knurled interference fit. A type of hybrid connection which is composed of two different types of an interference fit that in axial terms lie behind one another is provided in this design embodiment.

It has been demonstrated that the strength of electrical sheet has certain limitations. Potentially high torques have to be transmitted from the rotor shaft tube to insert shafts here, so that a purely force-fitting join is potentially insufficient or barely sufficient. The situation can be further aggravated when, in addition to the stress on account of the join between the shaft of the rotor and the insert shafts connected to the latter, there is also the stress on account of the join between the shaft and the laminated core.

It is because of this set of issues that the previously mentioned design embodiment provides the use of a hybrid connection. The force-fitting interference fit ensures a defined, clearance-free fit. The axially adjoining knurled spline molds itself into the mating partner, the latter ensuring a force-fitting and form-fitting connection which enables above all the transmission of high torques.

According to a second teaching, the invention achieves the object by an electric motor having a rotor according to one of the previously mentioned design embodiments. The explanations in the context of the variants of the rotor apply in an analogous manner also to the electric motor having such a rotor.

According to a third teaching the invention achieves the object by a method for producing a rotor, preferably for an electric motor. The method here comprises at least the steps that at least one central portion of a shaft is at least in part manufactured from an electrical sheet material, and that a laminated core is attached to the central portion. The design embodiments above relating to the rotor apply in an analogous manner also to the method, and vice versa.

One design embodiment of the method provides that the shaft is manufactured from the central portion and two end components, that the central portion is at least in part manufactured from an electrical sheet material, that the two end components are manufactured from a material which differs from the electrical sheet material, and that the two end components are connected to the central portion.

There are a multiplicity of possibilities for designing and refining details of the rotor according to the invention, the electric motor and the method for producing a rotor. To this end, reference is made to the patent claims dependent on the independent patent claims, on the one hand, and to the description hereunder of exemplary embodiments in conjunction with the drawing, on the other hand.

DETAILED DESCRIPTION

Figure 1:
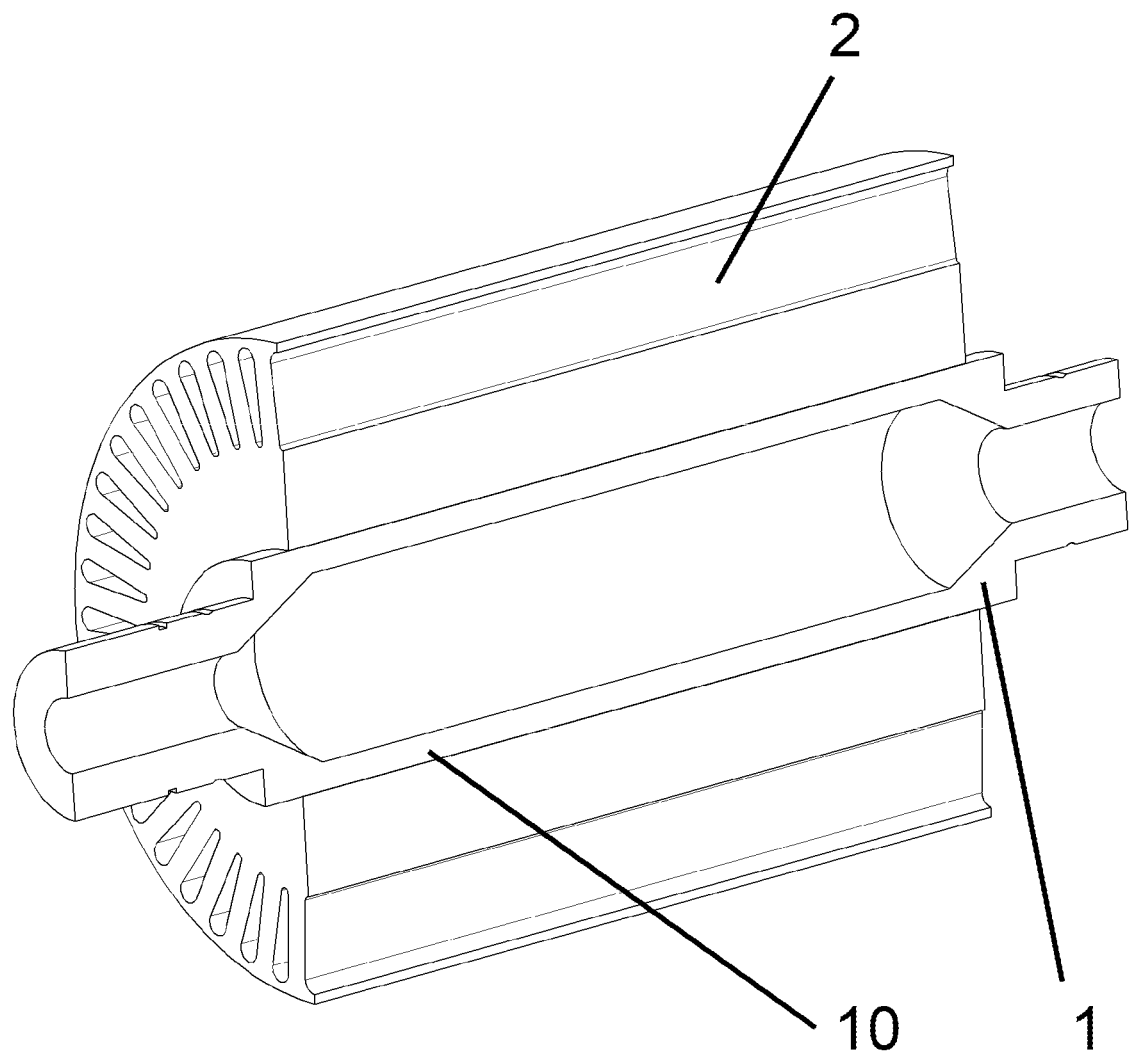
FIG. 1 shows a sectional isometric illustration of a first variant of a rotor in accordance with the present invention.

FIG. 1 shows a rotor which is part of an electric motor, for example.

The rotor possesses a shaft 1. The shaft 1, for example when in use, is connected to rotatable components or, for example, a gearbox and transmits a torque to the components or gearbox.

A laminated core 2 is situated on the central portion 10 of the shaft 1. As is commonplace in the prior art, the laminated core 2 is composed of electrical sheet and functions as a support of a squirrel cage rotor (not illustrated here).

The shaft 1 here is integrally designed and is at least in part composed of an electrical sheet material. The material of the shaft 1 in one design embodiment here is identical to the material of the laminated core 2. In an alternative design embodiment, two different electrical sheet materials are used for the shaft 1 and the laminated core 2. Depending on the design embodiment, inserts or supporting structures are provided in the shaft 1 in order to generate the required levels of strength.

Figure 2:
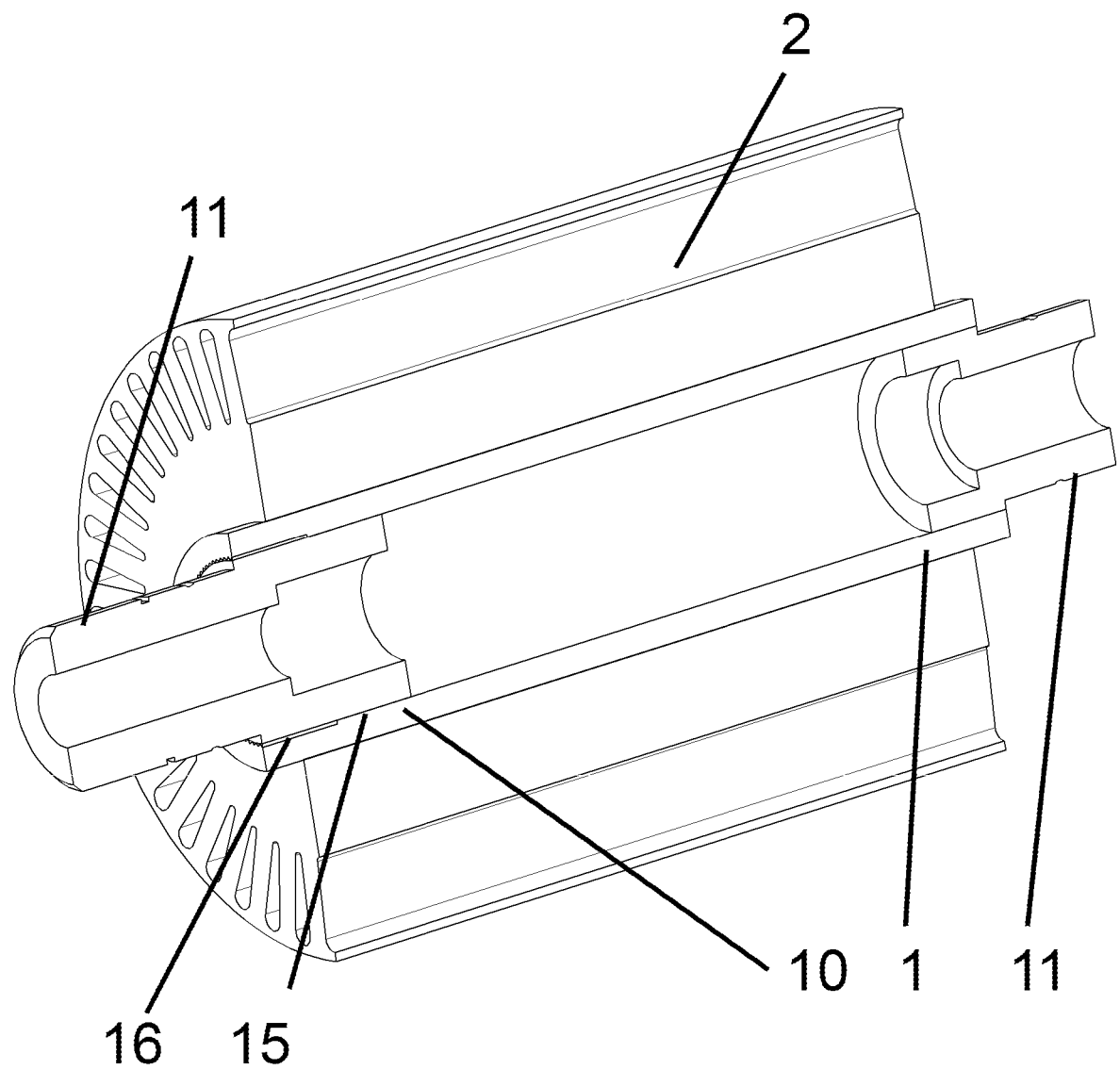
FIG. 2 shows a sectional isometric illustration of a second variant of a rotor in accordance with the present invention.

FIG. 2 shows an alternative embodiment of the shaft 1 for a rotor. The shaft here is in particular a constructed shaft 1. As opposed to the integral shaft 1 of the design embodiment of FIG. 1, this permits the respective matching materials to be used for different portions.

The shaft 1 is composed of three component parts: the central portion 10 for the electrical laminated core 2, and two end components 11 for the connection to further components or component parts of a vehicle, for example. The end components 11 thus also form the end sides of the shaft 1. The central portion 10 is composed of an electrical sheet material. The two end components 11 are not composed of electrical sheet material but, for example, of common steel, for example the previously mentioned carbon steels.

The central portion 10 here is designed as a hollow shaft, and the two end components 11 are plugged into the central portion 10.

The mechanical connection between the central portion 10 and the two end components 11 here is implemented by way of a type of hybrid connection, having a force-fitting interference fit 15 and, axially adjoining the latter, a knurled interference fit 16. A portion of an end region 11 has been provided with a knurl for the knurled interference fit 16. The knurled interference fit 16 is in each case manufactured so as to run axially in the direction away from the central portion 10 so that the interference fit 10 is in each case axially inside.

Figure 3:
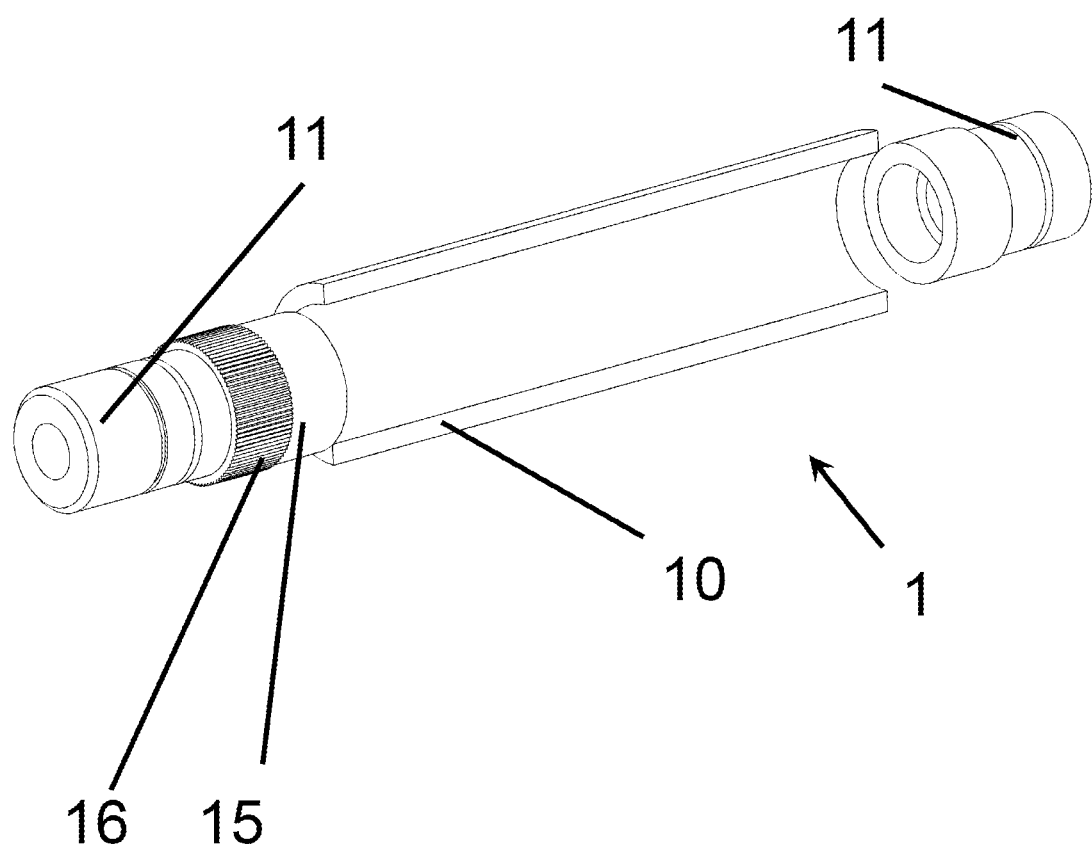
FIG. 3 shows a partially sectional exploded illustration of the shaft of FIG. 2.

The construction of the shaft 1, here in three parts, is illustrated in FIG. 3. The two end components 11 are fixed in the central portion 10 which is designed as a hollow tube. The axially inner region for the interference fit 15, on the one hand, and the knurled region, which is axially further outward, for the knurled interference fit 16, on the other hand, can be seen here, in particular, in the case of the end component 11 illustrated on the left-hand side.

The invention claimed is:

1. A rotor for an electric motor, comprising:
   a shaft; and
   a laminated core supported on the shaft,
   wherein
   the laminated core is formed from a first electrical sheet material,
   a central portion of the shaft which supports the laminated core is formed from a second electrical sheet material,
   the shaft includes two end components connected to the central portion of the shaft, and
   the two end components are formed from a material which is different from the central portion material and which has a higher strength or hardness than the central portion material.

2. The rotor according to claim 1, wherein
   the first electrical sheet material and the second electrical sheet material are the same material.

3. The rotor according to claim 1, wherein
   the laminated core is configured to support permanent magnets.

4. The rotor according to claim 1, wherein
   the laminated core is configured to support a squirrel cage rotor.

5. The rotor according to claim 1, wherein
   the central portion is hollow.

6. The rotor according to claim 5, wherein
   at least one of the two end components is connected to the central portion by a force-fitting interference fit.

7. The rotor according to claim 6, wherein
   at least one of the two end components is connected to the central portion by a knurled interference fit.

8. The rotor according to claim 5, wherein
   one of the two end components is connected to the central portion by a force-fitting interference fit and the other of the two end components is connected to the central portion by a knurled interference fit.

9. An electric motor, comprising:
   a rotor having a shaft and a laminated core supported on the shaft,
   wherein
   the laminated core is formed from a first electrical sheet material, a central portion of the shaft which supports the laminated core is formed from a second electrical sheet material,
   the shaft includes two end components connected to the central portion of the shaft, and
   the two end components are formed from a material which is different from the central portion material and which has a higher strength or hardness than the central portion material.

10. The electric motor according to claim 9, wherein
    the first electrical sheet material and the second electrical sheet material are the same material.

11. A method for producing a rotor for an electric motor, comprising the steps of:
    forming a laminated core at least in part from a first electrical sheet material;
    forming at least a central portion of a shaft at least in part from a second electrical sheet material; and
    locating the laminated core on the shaft, wherein
    the shaft includes two end components connected to the central portion of the shaft, and
    the two end components are formed from a material which is different from the central portion material and which has a higher strength of hardness than the central portion material.

* * * * *